United States Patent [19]
Williams

[11] Patent Number: 5,821,903
[45] Date of Patent: Oct. 13, 1998

[54] CONFORMAL ANTENNA FOR WIRELESS LOCAL AREA NETWORK TRANSCEIVERS

[75] Inventor: David Anthony Williams, Aptos, Calif.

[73] Assignee: Plessey Semiconductors Limited, United Kingdom

[21] Appl. No.: 554,517

[22] Filed: Nov. 7, 1995

[30] Foreign Application Priority Data

Nov. 11, 1994 [GB] United Kingdom .................. 9422838

[51] Int. Cl.⁶ ..................................................... H01Q 1/24
[52] U.S. Cl. ................................. 343/702; 343/700 MS; 455/90
[58] Field of Search ............................ 343/700 MS, 702, 343/803, 846, 841, 829, 847, 848; 235/492; 455/90, 351, 556; H01Q 1/24, 1/36, 23/00

[56] References Cited

U.S. PATENT DOCUMENTS

| | | | |
|---|---|---|---|
| 2,533,529 | 12/1950 | Spindler | 343/803 |
| 3,623,161 | 11/1971 | Fujimoto et al. | 343/702 |
| 4,546,357 | 10/1985 | Laughon et al. | 343/702 |
| 4,571,595 | 2/1986 | Phillips et al. | 343/702 |
| 4,694,301 | 9/1987 | Wassum | 343/702 |
| 4,800,392 | 1/1989 | Garay et al. | |
| 4,849,765 | 7/1989 | Marko | 343/702 |
| 5,327,584 | 7/1994 | Adachi et al. | 455/89 |
| 5,373,149 | 12/1994 | Rasmussen | 235/492 |
| 5,436,954 | 7/1995 | Nishiyama et al. | 379/58 |
| 5,542,106 | 7/1996 | Krenz et al. | 343/702 |
| 5,646,635 | 7/1997 | Cockson et al. | 343/872 |

FOREIGN PATENT DOCUMENTS

| | | |
|---|---|---|
| 0 474 490 A1 | 3/1992 | European Pat. Off. . |
| 0 623 967 A1 | 11/1994 | European Pat. Off. . |
| 0 629 071 A1 | 12/1994 | European Pat. Off. . |
| 2 277 841 | 11/1994 | United Kingdom . |

*Primary Examiner*—Hoanganh J. Le
*Assistant Examiner*—Tho Phan
*Attorney, Agent, or Firm*—Kirschstein et al.

[57] ABSTRACT

In a transceiver for a WLAN having a two-part folding housing of electrically insulating material, one part having a shielded compartment for the radio circuitry, there is provided a two-part strip-conductor antenna conforming with the outer surface of the one part of the housing, the radio compartment shielding forming a ground plane for this antenna.

2 Claims, 1 Drawing Sheet

CONFORMAL ANTENNA FOR WIRELESS LOCAL AREA NETWORK TRANSCEIVERS

BACKGROUND OF THE INVENTION

The present invention relates to conformal antennae for wireless local area network (WLAN) transceivers. In particular but not exclusively the invention relates to antennae for transceivers adapted to plug in in place of Personal Computer Memory Card International Association (PCMCIA) memory expansion cards.

Such transceivers generally comprise a computer interface, a WLAN controller and transmitter and receiver circuits operating at carrier frequencies of the order of 2.4 GHz, and can provide 1 Mbit/sec data links for personal computers or notebook computers over short ranges of the order of, say, one hundred feet.

SUMMARY OF THE INVENTION

According to the present invention in a transceiver for a wireless local area network, the transceiver comprising a housing of electrically insulating material having inner surfaces defining a compartment for transmitter and receiver circuits of said transceiver and an outer surface, and an electrically screening coating on at least some of said inner surfaces defining said compartment, there is provided an antenna comprising at least one strip conductor on said outer surface of said housing, said strip conductor being electrically insulated from said screening coating.

Preferably there are provided two said strip conductors extending in opposite directions around an edge of said housing and conforming to said outer surface, from a pair of spaced feed conductors that extend from the outer surface of said housing to one of said inner surfaces defining said compartment. The housing may be of two-part hinged form, a first part defining said compartment and a second part being of the form of a PCMCIA memory expansion card.

BRIEF DESCRIPTION OF THE DRAWINGS

A transceiver having an antenna in accordance with the present invention will now be described with reference to the accompanying drawing, of which.

DETAILED DESCRIPTION OF THE PREFERRED EMBODIMENT

Figure 1:
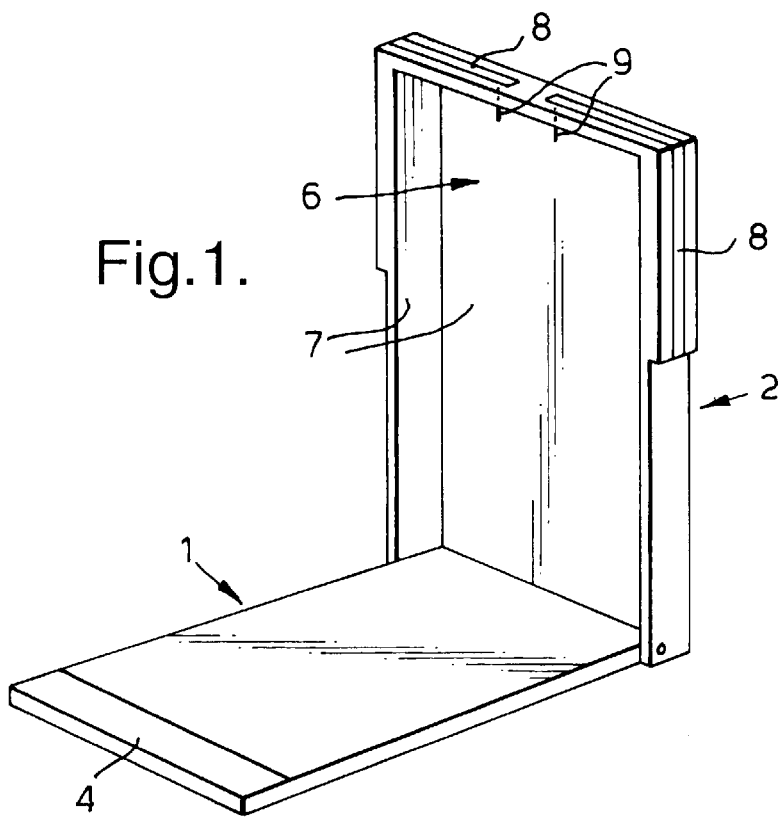
FIG. 1 shows diagrammatically parts of the transceiver.
Figure 2:
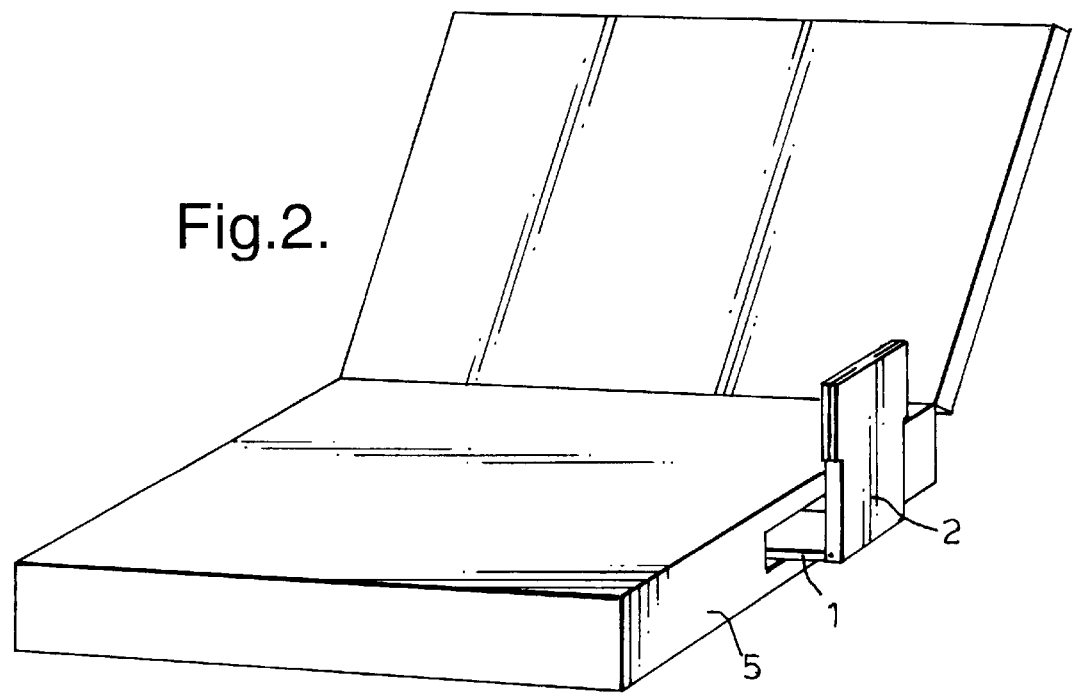
FIG. 2 shows diagrammatically a transceiver in conjunction with a lap-top computer.

Referring to the drawings, the transceiver includes a housing comprising two parts 1 and 2 connected by a hinge 3, the first part 1 being in the form and size of a PCMCIA memory expansion card, say some 54 mm wide, 86 mm long and 5 mm thick, with a plug connector 4 at its free end for connection to a socket connector provided on a lap-top computer 5 (FIG. 2). The part 1 may carry for example computer interface circuitry (not shown) and a local area network controller (not shown), while the part 2 may be shaped so as to provide a compartment 6 for radio transmitter and receiver circuits (not shown), and to partially enclose the first part 1 in a closed or folded position.

The inner surfaces 7 of the part 2 which define the compartment 6 are provided with a coating of electrically conducting material which electrically shields or screens the transmitter and receiver circuitry in the compartment 6.

Around part of the outer edge of the part 2 there is provided an antenna comprising two conductive strips 8, preferably copper strips, formed or fixed on the outer surface of the part 2 and electrically insulated either by the material of the housing, by an underlying dielectric layer (not shown), or by an air gap (not shown) from the screening coating on the inner surfaces 7. These strips 8, which extend in L-shape around the outer corners of the part 2, are electrically connected to circuitry (not shown) within the compartment 6 by conductors 9 electrically connected to adjacent ends of the strips 8. The conductive coating on the inner surfaces 7 of the part 2 acts as a ground plane for the antenna strips 8.

The length of the strips 8 is chosen so that the impedance of the antenna at the operating frequency, measured at the conductors 9, is inductive, so that the antenna may be matched to the radio transmitter and/or receiver circuitry by means of a capacitor (not shown) connected between a or each conductor 9 and ground. The transmitter and receiver circuitry may be connected to the circuits on the part 1 by way of a flexible cable (not shown) across the hinge joint 3.

I claim:

1. A transceiver for a wireless local area network, comprising:

a) a housing of an electrically insulating material and including first and second parts connected by hinge means, said first part of said housing having inner surfaces defining a compartment for transmitter and receiver circuits of said transceiver and an outer surface, and said second part of said housing having a form and size of a personal computer memory card international association (PCMCIA) memory expansion card;

b) a screening coating of an electrically conducting material on at least some of said inner surfaces of said first part of said housing;

c) an antenna including at least one strip of an electrically conductive material on said outer surface of said first part of said housing and conforming to said outer surface; and d) at least one electrically conducting feed conductor extending from said outer surface of said first part of said housing into said compartment, said feed conductor being connected to said antenna, and said feed conductor and said antenna being electrically insulated from said screening coating.

2. The transceiver in accordance with claim 1, wherein the antenna includes two strips of the electrically conductive material extending in opposite directions from a pair of spaced feed conductors around an edge of said first part of said housing and both conforming to said outer surface.

* * * * *